US006179395B1

(12) United States Patent
Schneider

(10) Patent No.: US 6,179,395 B1
(45) Date of Patent: Jan. 30, 2001

(54) METHOD AND APPARATUS FOR REGENERATIVE AND ANTI-SKID FRICTION BRAKING

(75) Inventor: Michael John Schneider, Bloomfield Hills, MI (US)

(73) Assignee: Visteon Global Technologies, Inc., Dearborn, MI (US)

( * ) Notice: Under 35 U.S.C. 154(b), the term of this patent shall be extended for 0 days.

(21) Appl. No.: 08/942,039

(22) Filed: Oct. 1, 1997

(51) Int. Cl.[7] .................................................. B60T 8/64
(52) U.S. Cl. ........................................ 303/152; 303/113.1
(58) Field of Search .............................. 303/3, 15, 113.1, 303/152; 188/156, 159

(56) References Cited

U.S. PATENT DOCUMENTS

| | | | |
|---|---|---|---|
| 5,318,355 | * | 6/1994 | Asanuma et al. ........................ 303/3 |
| 5,378,053 | * | 1/1995 | Patient et al. ........................... 303/3 |
| 5,399,000 | * | 3/1995 | Aoki et al. .............................. 303/3 |
| 5,542,754 | * | 8/1996 | Aoki et al. ............................ 303/152 |
| 5,765,929 | * | 6/1998 | Hirano et al. ......................... 303/167 |

* cited by examiner

Primary Examiner—Robert J. Oberleitner
Assistant Examiner—Devon Kramer
(74) Attorney, Agent, or Firm—Leslie C. Hodges

(57) ABSTRACT

A method and apparatus for providing regenerative and friction braking on a vehicle having one or more wheels driven by a drive motor includes a master cylinder (28), a hydraulic control unit (30), a brake control unit (38), a drive motor control unit (52) and a drive motor (18). The brake control unit commands build and dump valve pairs (31, 35) such that brake forces generated at the driven left and right wheels (14, 16) are a combination of the regenerative braking and hydraulic braking, the hydraulic braking being gradually reduced and the regenerative braking being gradually increased during transitions from anti-skid braking control to wheel speed based proportioning and regenerative braking control.

13 Claims, 3 Drawing Sheets

METHOD AND APPARATUS FOR REGENERATIVE AND ANTI-SKID FRICTION BRAKING

This application is related to co-pending applications, entitled "METHOD AND APPARATUS FOR REGENERATIVE AND FRICTION BRAKING" "METHOD AND APPARATUS FOR PROPORTIONING REGENERATIVE BRAKING" and "METHOD AND APPARATUS FOR REGENERATIVE AND FRICTION BRAKING", respectively, all filed on Sep. 30, 1997 and assigned to the assignee of the present application.

BACKGROUND OF THE INVENTION

1. Field of the Invention

This invention relates generally to a method and apparatus for regenerative and anti-skid friction braking of a motor vehicle having an electric drive motor. More particularly, the present invention relates to a braking system that smoothly and efficiently transitions from anti-skid control into wheel speed based proportioning of front to rear braking during regenerative braking.

2. Disclosure Information

The general principle of regenerative braking has been recognized by manufacturers of electric vehicles as a way of increasing the overall efficiency of the vehicle. Regenerative braking seeks to recover as much of the kinetic energy of the vehicle which is normally dissipated as heat through a normal hydraulic friction system by operating the electric motor drive even as a generator and restoring the generated electricity to a battery or other energy storage device. Various methods have been proposed for accomplishing regenerative braking in such electric vehicles, however, these regenerative systems generally require additional hardware above and beyond that normally associated with a hydraulic braking system.

It would therefore be advantageous to provide a regenerative and friction braking system capable of recovering the kinetic energy normally lost through heat generation and dissipation resulting from the use of conventional hydraulic brake systems, including immediately after an anti-skid braking event.

SUMMARY OF THE INVENTION

Accordingly, the present invention provides a method and apparatus for providing regenerative and friction braking on a vehicle having one or more wheels driven by a drive motor utilizing hardware from a conventional anti-skid hydraulic friction braking system. The regenerative and friction braking apparatus includes a master cylinder for generating a hydraulic signal in response to a driver brake command and a pressure sensor for generating a pressure signal representative of the hydraulic signal. A throttle sensor is also included for generating an acceleration signal in response to a driver acceleration command.

The apparatus also includes an undriven left wheel having a first brake actuator and a first speed sensor operatively associated therewith for generating an undriven left wheel speed signal as well as an undriven right wheel having a second brake actuator and a second speed sensor operatively associated therewith for generating an undriven right wheel speed signal. Additionally, driven left and right wheels connect to the drive motor and include third and fourth brake actuators and third and fourth speed sensors operatively associated therewith for generating driven left and right wheel speed signals.

A hydraulic control unit is provided and is in fluid communication with the master cylinder and the first, second, third and fourth brake actuators, respectively.

The apparatus further includes a power storage device in communication with the drive motor.

A brake controller is included for generating a transition signal responsive to exiting an anti-skid control mode and entering a wheel speed based proportioning with regenerative braking control mode and reducing the hydraulic signal communicated to the third and fourth brake actuators in response to the transition signal.

A drive motor controller is provided for increasing regenerative braking generated by the drive motor in response to the transition signal and the pressure signal.

The method of operating the regenerative and friction braking apparatus for the vehicle comprises the steps of:

generating a hydraulic signal in response to a driver brake command as applied to a master cylinder;

producing a pressure signal representative of the hydraulic signal;

producing an acceleration signal in response to a driver acceleration command;

producing undriven left and right wheel speed signals;

producing driven left and right wheel speed signals;

generating a transition signal responsive to exiting an anti-skid control mode and entering a wheel speed based proportioning with regenerative braking control mode;

modulating the hydraulic signal with third and fourth build and dump valve pairs in response to the transition signal so as to reduce hydraulic braking generated at the driven left and right wheels; and commanding the drive motor to regeneratively brake the driven left and right wheels in response to the transition, acceleration and pressure signals.

Advantageously, the method and apparatus for providing regenerative and anti-skid friction braking increases the efficiency of such hybrid braking systems to maximize the recovery of kinetic energy normally lost through heat generation and dissipation resulting from the use of conventional hydraulic brake systems using conventional anti skid hardware.

DETAILED DESCRIPTION OF THE PREFERRED EMBODIMENT

Figure 1:
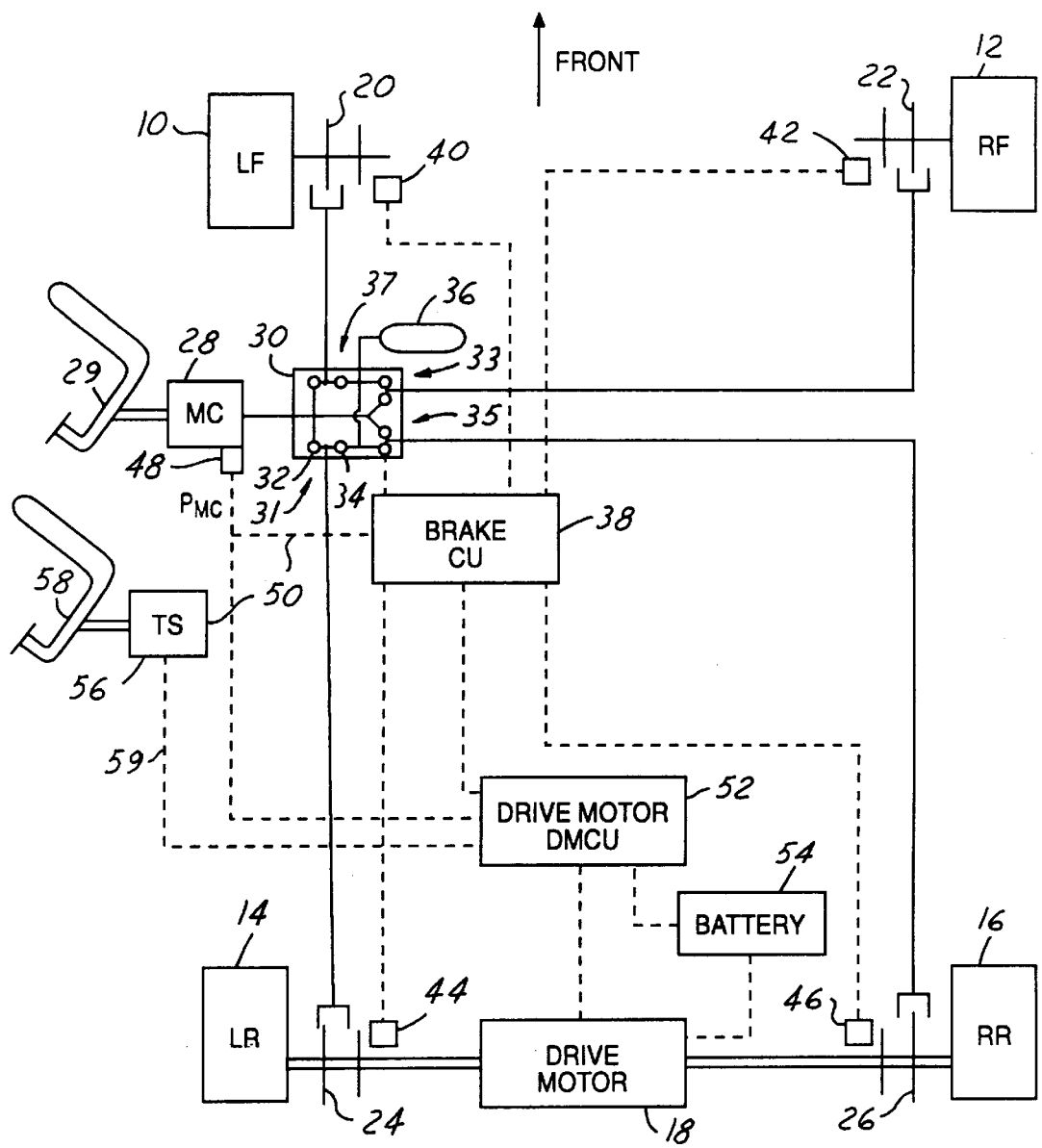
FIG. 1 is a schematic illustration of a motor vehicle incorporating a method and apparatus for regenerative and friction braking in accordance with the present invention.

Referring now to FIGS. 1, the example vehicle braking system illustrated includes left and right front wheel 10 and 12 and left and right rear wheels 14 and 16 driven by an electric drive motor 18. The front and rear wheel 10, 12, 14 and 16 have respective hydraulic brakes 20, 22, 24 and 26 actuated by hydraulic pressure generated by a master cylinder 28 in response to an operators brake demand generated through a brake pedal 29. The brake actuators 20, 22, 24 and 26 are hydraulically coupled to the master cylinder 28 by hydraulic control unit 30.

The hydraulic control unit 30 includes four pairs of valves, 31, 33, 35 and 37, each pair having a build valve 32 and a dump valve 34 (for each brake actuator) and a hydraulic pump (not shown). The inlet side of the build valve is hydraulically connected to the master cylinder and the outlet side of the build valve communicates hydraulic fluid to the associated dump valve and its associated brake actuator. The dump valve 34 communicates hydraulic fluid to a brake fluid accumulator 36. The build and dump valve pairs operate in manner similar to build and dump valves found on conventional anti-skid systems, permitting the hydraulic pressure at the individual brake actuators to be regulated. Using the master cylinder as the input, this pressure can range from zero up to the full pressure of the master cylinder.

The build valve 32 and dump valve 34 are of the electromagnetic valve configuration and receive their control signal from a brake control unit (BCU) 38. The BCU uses data collected from left and right front wheel speed sensors 40, 42 and left and right rear wheel speed sensors 44, 46 and a pressure sensor 48 associated with the master cylinder for generating a master cylinder pressure signal 50. The BCU is also in communication with the drive motor control unit (DMCU) 52 and shares data therewith so that the rear wheels may cooperatively be regeneratively braked by the drive motor 18 in order to charge an energy storage device such as a battery 54. The DMCU is further in communication with a throttle sensor 56 which is operated by a conventional accelerator pedal 58 in response to the foot pressure applied by the vehicle operator.

The BCU 38 and the DMCU 52 cooperatively control the front and rear brakes 20, 22, 24 and 26 to establish a desired braking condition as requested by the driver and represented by the master cylinder pressure signal 50.

The control units 38, 52 each are microprocessor based devices including random access and read-only memories and appropriate input/output interface circuitry to receive the input signals and provide the command outputs as described and shown. Construction of suitable controllers is within the level of one skilled in the art.

Figure 2A:
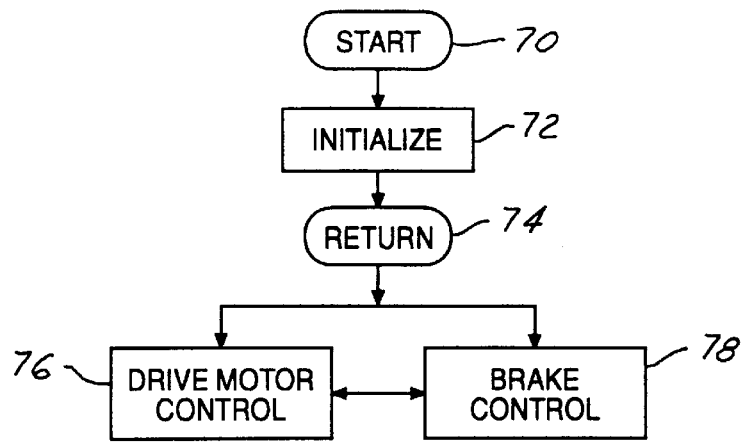
FIG. 2A is a high-level flow chart illustrating the interrelationship of the control of the motor and the brake system of a motor vehicle incorporating a method and apparatus for regenerative and friction braking in accordance with the present invention.

Referring now to FIG. 2A, in general the BCU and DMCU operate in tandem and share data. In the preferred embodiment, this exchange of data occurs via a multiplex communication bus. In view of this, the operation of the DMCU will be described first and the operation of the BCU will be described thereafter with interdependencies being described where they occur. It should be recognized that the various steps being described are described in the illustrated sequence for convenience, it being understood that there is no specific order unless specifically mentioned. As a further note, those skilled in the art will recognize that the logic of the control systems illustrated and described may be implemented in a single controller, or as shown in two separate controller units.

As represented by the flow chart of FIG. 2A, the vehicle is started at block 70 and various system parameters are initialized at block 72 in each of the controllers. During operation, the drive motor control 76 and the brake control 78 will issue commands to return to the top of the flow chart at the return block 74.

Figure 2B:
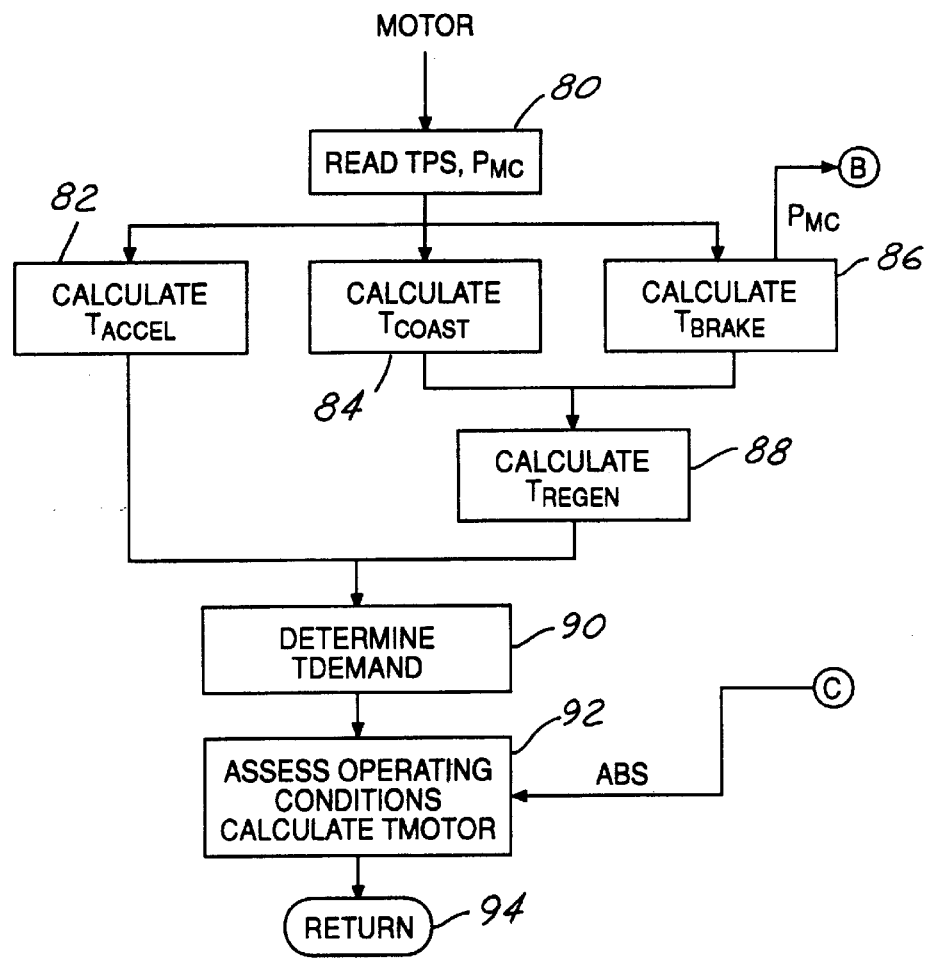
FIG. 2B is a flow chart illustrating motor control logic constructed in accordance with the present invention.

Referring now to FIGS. 2A & 2B, the DMCU 52 implements the drive motor control 76, which includes the steps represented by the flow chart shown. At block 80, the DMCU 52 senses acceleration command via the throttle position sensor 56, which provides an acceleration signal representing the displacement of the accelerator pedal 58 in response to a pressure applied to the accelerator pedal 58 by the operator. Similarly, the drive motor controller senses a braking command by sensing the master cylinder pressure which exists when the vehicle operator applies pressure to the brake pedal 29 at the pressure sensor 48.

At block 82, the DMCU 52, in response to the acceleration signal, determines an appropriate acceleration torque necessary to satisfy the acceleration command, $T_{ACCEL}$. At block 84, the DMCU determines whether coast down braking is required to simulate the compression braking created by a part or closed throttle condition of an internal combustion engine. In a conventional manner, the motor controller evaluates the acceleration signal, the motor RPM and other vehicle operating parameters and determines an appropriate coast down torque, $T_{COAST}$.

At block 86, the motor controller takes the pressure signal 50 generated by the pressure sensor 48 and determines an appropriate amount of braking torque, $T_{BRAKE}$, to be generated by the drive motor according to the following relationship:

$$T_{BRAKE} = P_{MC} * K_B$$

where $P_{MC}$ is a value corresponding to the pressure signal and $K_B$ is a constant empirically derived in view of the characteristics of the brake system. It should be recognized that more complex methods may be used for determining $T_{BRAKE}$, such as the use of a lookup table representing the ideal front to rear brake proportioning relationship for the given vehicle. At block 88 the DMCU determines the total torque for regenerative motor control, $T_{REGEN}$, by adding $T_{COAST}$ and $T_{BRAKE}$.

At block 90, the motor controller determines the total torque demand, $T_{DEMAND}$, by summing $T_{ACCEL}$ and $T_{REGEN}$. At block 92, the DMCU accesses a variety of operating conditions to determine whether or not the drive motor 18 can be operated and whether the torque command exceeds predetermined limits of the drive motor. For instance, the DMCU may invoke power conserving modes if there is low voltage in the battery 54 to limit the energy available for acceleration or similarly if the battery is substantially charged, the DMCU may limit the regenerative torque. Another condition which may result in limited or no regenerative torque being created by the drive motor is if an ABS mode flag is set to indicate an ABS event, or if the system is undergoing a transition from anti-skid control to regenerative control, both of which will be described in greater detail below. After determining what limitations apply, the DMCU issues a motor torque signal, TMOTOR, to command the drive motor and returns via return block 94 to return block 74.

Figure 2C:
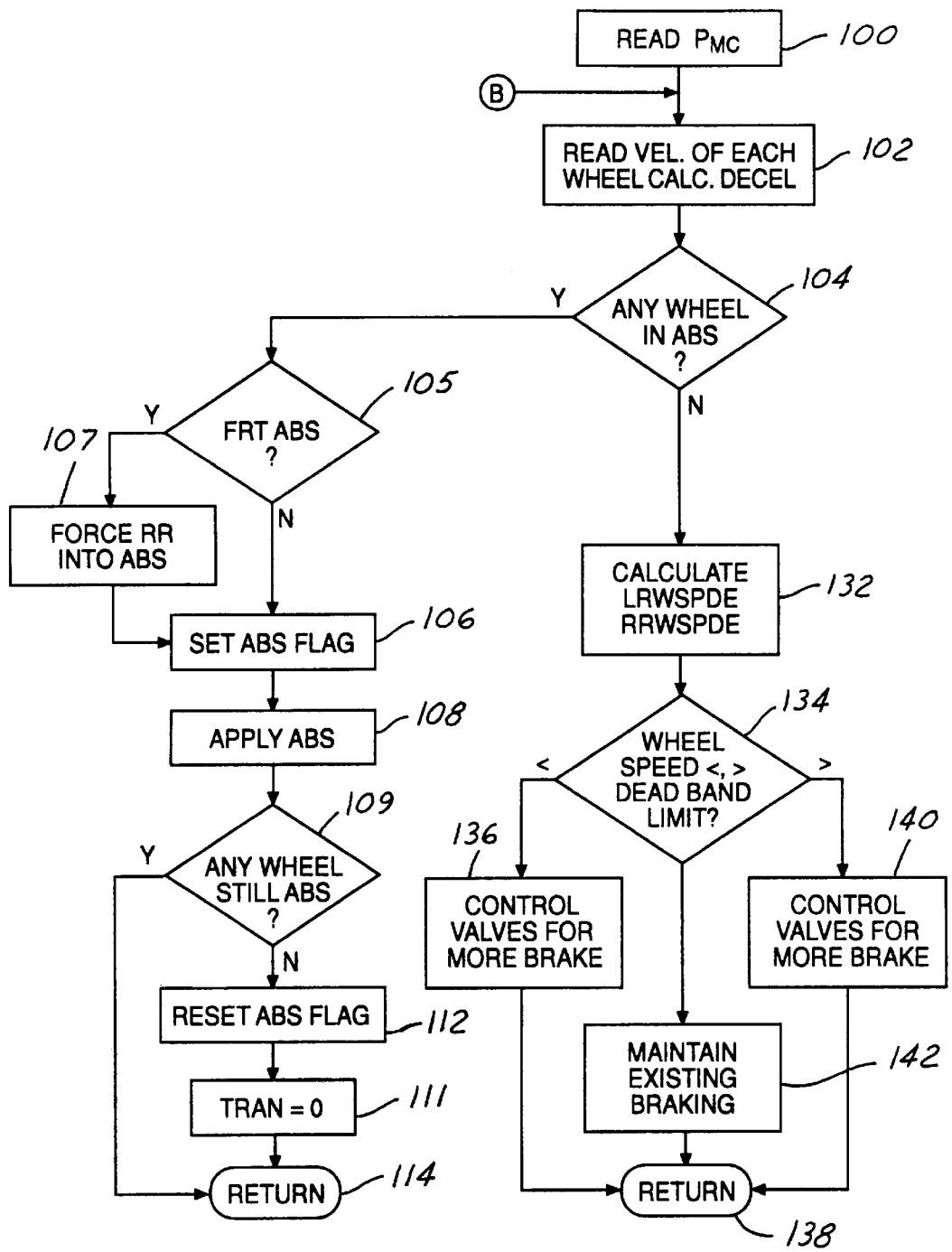
FIG. 2C is a flow chart illustrating brake control logic constructed in accordance with the present invention.

Referring now to FIGS. 2A & 2C, the BCU 38 implements the brake control 78, which includes the steps represented by the flow chart shown. At block 100 the BCU 38 reads the master cylinder pressure signal 50 as generated by the pressure sensor 48. BCU advances to block 102 where each of the wheel speeds sensors 40, 42, 44 and 46 are read. Using this data, the BCU estimates the vehicle velocity and calculates the deceleration rate of each wheel 10, 12, 14 and 16.

At block 104, the brake controller determines whether any of the wheels are in an anti-skid braking mode, and if so, block 105 determines if it is a front wheel, rear wheel or combination thereof. It is necessary to make this determination because the anti-skid control system works strictly with the hydraulic actuators, so in the event of rear wheel anti skid control it is necessary to disable or reduce the regenerative braking created by the drive motor. In order to maintain or attain maximum regenerative efficiencies, however, it is desirable to resume regenerative braking as quickly as possible after any anti-skid event, preferably even before the pressure signal returns to zero.

In the present embodiment, the BCU determines whether or not a front wheel or rear wheel requires anti-skid control by differencing the wheel speed signal for a given wheel and the estimated vehicle speed signal and comparing the resulting difference signal and the deceleration rate signal to predetermined thresholds. In the event the difference signal and/or deceleration rate signal exceeds the predetermined thresholds, the BCU enters anti-skid control.

If either of the front wheels requires anti-skid control, the BCU can not use the wheel speed from that wheel for proportioning control of the corresponding rear wheel, as the speed from the front wheel requiring anti-skid control is not representative of the desired rear wheel speed. To overcome this lack of control data, at block 107 the BCU cycles the build valves for the rear wheel actuators, possibly over successive computational cycles, until sufficient hydraulic signal exists to invoke anti-skid control for the rear wheels. The BCU then proceeds to block 106 where an ABS mode flag indicating the system under anti-skid control is set and communicated to block 92 of the DMCU. The BCU proceeds to block 108 where it implements the anti-skid control.

Once in anti-skid control, at block 109 the BCU determines when anti-skid control is no longer required by comparing the difference and deceleration rate signals to the predetermined thresholds while gradually increasing the hydraulic signal transmitted to the actuator through the build valve. The build valve increases pressure until the wheel requires anti-skid control or the difference and deceleration signals do not exceed the predetermined thresholds when the entire pressure signal from the master cylinder is applied for a predetermined period of time, such as one second. If the predetermined thresholds are exceeded, anti-skid control is continued at block 105 and the dump valve is opened, dropping the pressure at the actuator. After the wheel has met certain wheel speed and acceleration predetermined values, the build valve is again cycled to increase pressure in the actuator. If the predetermined thresholds are not being exceeded, the BCU concludes that the wheel no longer requires anti-skid control and the BCU proceeds to block 111.

The transition from anti-skid control back into regenerative braking should be smooth to avoid objection by the operator and quick for maximum efficiency. In the case where both front wheels come out of anti-skid control first, the target wheel speeds may be re-established for the rear wheels, allowing wheel speed based proportioning and regenerative braking as soon as the rear wheels come out of anti-skid control. When this occurs, the DMCU pumps up the regenerative braking to its full level over a predetermined period of time, such as 0.3 seconds, while simultaneously the BCU controls the dump valve of the rear brakes to reduce hydraulic pressure at the respective rear actuator to maintain speed based front to rear proportioning through the transition from anti skid control to regenerative brake control. Alternatively, this transition could be done gradually, using a counter which is set to a predetermined value at block 111, rather than pumping up for a predetermined period of time. The BCU proceeds to block 112 where the ABS flag is reset indicating non-anti-skid control and communicated to block 92 of the DMCU and the BCU returns to return block 74 via the return block 114.

Even if the rear wheels come out of anti-skid control first, the BCU will not have a wheel speed target to use for wheel speed based proportioning control. At this point, the wheel actuators will continue to receive the full hydraulic signal from the master cylinder until they reenter anti-skid control or the front wheels come out of anti-skid control, as determined at block 109, permitting the transition back to wheel speed based proportioning control and regenerative braking.

At block 105, if only the rear wheels require anti-skid control, regenerative braking is suspended, and at block 106 the ABS mode flag is triggered and communicated to block 92 of the DMCU indicating anti-skid operation. The BCU performs anti-skid control until the rear wheels no longer require anti-skid control, at which point vehicle braking can be transitioned into wheel speed based proportioning control and regenerative braking using the control data from the front wheels.

At block 104, if the BCU determines that none of the wheels are in ABS mode, control proceeds to block 131 where the transition counter TRAN is evaluated. If it is not equal to zero, the system is undergoing transition back into full regenerative braking under wheel speed based proportioning control. Until TRAN is equal to zero, the DMCU increases the regenerative braking proportionally so that the regenerative braking is gradually increased. For instance, at block 92, the DMCU may simply change the control limit for the regenerative braking to account for the value of TRAN. The BCU then decrements the counter, TRAN and proceeds to block 132 where rear wheel speed errors are calculated according to the following relationships:

LRWSPDE=LRWSPDT−LRWSPD

RRWSPDE=RRWSPDT−RRWSPD where LRWSPDE and RRWSPDE represent the error signals for the left and right rear wheels, respectively. Also, LRWSPDT and RRWSPDT represent the left and right rear wheel speed targets, which are established by setting these values equal to the corresponding front wheel speed, that is LRWSPDT=LFWSPD, where LFWSPD is the left front wheel speed and RRWSPDT=RFWSPD where RFWSPD is the speed of the right front wheel. Alternatively, these targets could also be established as a mathematical function of the front wheel speed. It should be recognized that the error itself could also be represented by the difference of the wheel speed and the deadband limits. Following this convention, LRWSPD and RRWSPD are the left and right rear wheel speeds, respectively.

As an alternative, in the event that the system is built using a single build and dump valve pair for controlling the brake actuators on the driven axle, only a single target need be set. In a system having separate right and left driven wheel speed signals, it would be advantageous to control the valves by setting the target equal to either the average of the two front wheel speeds and controlling the average of the two rear wheel speeds or to the front wheel speed on the side of the vehicle having the lower of the two rear wheel speeds and controlling the lower of the two rear wheel speeds. In the event there is only one rear wheel speed signal, either the higher of the two front wheel speed signals or an average of the two front wheel speed signals would be used as the target.

Figure 3:
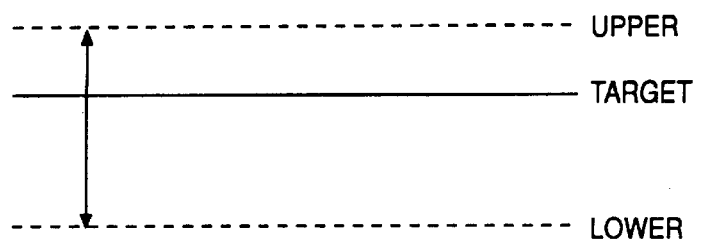
FIG. 3 is graph illustrating a deadband used by a controller of the present of the invention.

At block 134, the BCU evaluates the individual right and left rear wheel speed signals against a predetermined deadband. Referring to FIG. 3, a graph illustrating the relationship of upper and lower deadband limits set about a given target. The upper and lower deadbands may be found by adding and subtracting constant values to the target value or by adding and subtracting a predetermined percentage of the target value. The upper and lower deadband limits may or may not be equally spaced about the target. Depending on whether wheel speeds are within the deadband or out determines the next operation of the BCU.

Referring back now to FIG. 2C, the BCU proceeds to block 136 if one of the wheel speeds is below the lower deadband limit, and the BCU commands the hydraulic control unit 30 to reduce the brake pressure for the actuator of that rear wheel.

The hydraulic control unit 30 accomplishes this by opening the dump valve 34 for the given brake actuator such that brake pressure in the line at the brake actuator can vent to the accumulator 36. The dump valve 34 may be operated via a pulse width modulated (pwm) signal generated by the BCU in proportion to the wheel speed error. The BCU proceeds via return block 138 to return block 74.

If one of the wheel speed signals is above the upper deadband limit, indicating the rear wheel speed is too high, the BCU proceeds to block 140 to open the build valves 32 and build pressure in the actuator of that wheel. In the preferred embodiment, this is done via a control signal sent from the BCU to the hydraulic control unit in the form of a pulse width modulated signal proportional to the wheel speed error. It should be recognized by those skilled in the art that the pulse width modulated signal used for controlling the build and dump valves can be derived using proportional, integral and derivative control schemes as well as any other method. The BCU returns to block 74 via return block 138.

If the wheel speed is within the deadband, the BCU takes no action, thus maintaining the existing brake pressures and passing through block 142 to return block 74 via return block 138.

Therefore, under normal braking the regenerative brake system of the present invention operates by first having the DMCU command the drive motor to generate a regenerative braking torque, $T_{REGEN}$ and the BCU closes the build valve to cut off brake pressure to the rear actuators. Thereafter, the hydraulic brake system supplements this regenerative braking by opening the build valve to the extent necessary to achieve desired front to rear proportioning of the overall braking forces generated during braking events that do not invoke anti-skid control. The desired front to rear brake proportioning is achieved by controlling the individual rear wheel speeds to be approximately equal to, or just below, the wheel speed of the corresponding front wheel. The result of this control scheme is the generation of maximum regenerative braking from the driven rear wheels supplemented with hydraulic braking only when the braking demand exceeds the regenerative braking capacity of the drive motor. Any supplemental hydraulic braking is proportioned according to the wheel speeds which are representative of wheel slip.

The foregoing description presents a preferred embodiment of the present invention. Details of construction have been shown and described for purposes of illustration rather than limitation. For instance, it could be advantageous to use a single valve for controlling the hydraulic pressure applied to brake actuators for the driven wheels of the vehicle, thus reducing complexity and cost over a system having both a build and a dump valves. Additionally, the present invention could be applied to vehicles having the driven wheels located at either the front or rear of the vehicle. Other modifications and alterations of the invention will no doubt occur to those skilled in the art that will come within the scope and spirit of the following claims:

I claim:

1. A regenerative and friction braking apparatus for a vehicle having one or more wheels driven by a drive motor, comprising:

a master cylinder for generating a hydraulic signal in response to a driver brake commend;

a pressure sensor for generating a pressure signal representative of said hydraulic signal;

a throttle sensor for generating an acceleration signal in response to a driver acceleration command;

an undriven wheel having a first brake actuator and a first speed sensor operatively associated therewith for generating an undriven wheel speed signal;

a driven wheel connected to the drive motor and having a third brake actuator and a third speed sensor operatively associated therewith for generating a driven wheel speed signal;

a hydraulic control unit in fluid communication with said master cylinder and said first and third brake actuators;

a power storage device in communication with the drive motor;

brake control means for generating a transition signal responsive to exiting an anti-skid control mode and calculating a wheel speed based error signal and comparing said wheel speed based error signal to a reference value and entering a wheel speed based proportioning with regenerative braking control mode; and drive motor control means for gradually increasing regenerative braking generated by the drive motor in response to said transition signal and said pressure signal.

2. A regenerative and friction braking apparatus according to claim 1, wherein said transition signal represents a linear counter and said regenerative braking generated by the drive motor is progressively restored in proportion to the value of said transition signal.

3. A regenerative and friction braking apparatus according to claim 1, wherein:

said hydraulic control unit further comprises first and third build and dump valves in fluid communication with first and third brake actuators;

said drive motor control means further commanding the drive motor to regeneratively brake said driven wheel in response to said acceleration signal and said pressure signal; and said brake control means further commanding said third build and dump valve pair such that brake forces generated at said driven wheel is a combination of said regenerative braking and hydraulic braking by said third hydraulic actuator, said hydraulic braking being limited in response to a wheel speed error signal by modulation of said third build and dump valve pair so as to maintain a predetermined front to rear brake proportioning through a transition from said anti-skid control mode into said wheel speed based proportioning with regenerative braking control mode.

4. A regenerative and friction braking apparatus according to claim 3, wherein said wheel speed error signal is determined by a predetermined percentage of a difference of said driven wheel speed signal and said undriven wheel speed signal.

5. A regenerative and friction braking apparatus according to claim 3, further comprising a brake fluid accumulator operatively connected with said dump valves of said hydraulic control unit.

6. A regenerative and friction braking apparatus for a vehicle having one or more wheels driven by a drive motor, comprising:

a master cylinder for generating a hydraulic signal in response to a driver brake command;

a pressure sensor for generating a pressure signal representative of said hydraulic signal;

a throttle sensor for generating an acceleration signal in response to a driver acceleration command;

an undriven left wheel having a first brake actuator and a first speed sensor operatively associated therewith;

an undriven right wheel having a second brake actuator and a second speed sensor operatively associated therewith;

a driven left wheel connected to the drive motor and having a third brake actuator and a third speed sensor operatively associated therewith;

a driven right wheel connected to the drive motor and having a fourth brake actuator and a fourth speed sensor operatively associated therewith;

a hydraulic control unit in fluid communication with said master cylinder and having first, second, third and fourth build and dump valve pairs in fluid communication with said first, second, third and fourth brake actuators, respectively;

a power storage device in communication with the drive motor;

brake control means for generating a transition signal responsive to exiting an anti-skid control mode and calculating a wheel speed based error signal and comparing said wheel speed based error signal to a reference value and entering a wheel speed based proportioning with regenerative braking control mode; and drive motor control means for gradually increasing regenerative braking generated by the drive motor in response to said transition signal and said pressure signal.

7. A regenerative and friction braking apparatus according to claim 6, wherein said transition signal represents a linear counter and said regenerative braking generated by the drive motor is progressively restored in proportion to the value of said transition signal.

8. A regenerative and friction braking apparatus according to claim 6, wherein:

said drive motor control means further commanding the drive motor to regeneratively brake said driven left and right wheels in response to said acceleration signal and said pressure signal; and said brake control means further commanding said third and fourth build and dump valve pairs such that brake forces generated at said driven left and right wheels are a combination of said regenerative braking and hydraulic braking by said third and fourth hydraulic actuators, said hydraulic braking being limited in response to left and right wheel speed error signals and said transition signal by modulation of said third and fourth build and dump valve pairs so as to maintain a predetermined front to rear brake proportioning through a transition from said anti-skid control mode into said wheel speed based proportioning with regenerative braking control mode.

9. A regenerative and friction braking apparatus according to claim 8, wherein said left and right wheel speed error signals are determined by a predetermined percentage of a difference of said driven left and right wheel speed signals and said undriven right and left wheel speed signals, respectively.

10. A regenerative and friction braking apparatus according to claim 8, further comprising a brake fluid accumulator operatively connected with said dump valves of said hydraulic control unit.

11. A regenerative and friction braking apparatus according to claim 8, wherein said left and right wheel speed error signals are determined by differencing said driven left and right wheel speed signals with said undriven left and right wheel speed signals, respectively.

12. A method of operating a regenerative and friction braking apparatus for a vehicle having one or more wheels driven by a drive motor, comprising the steps of:

generating a hydraulic signal in response to a driver brake command as applied to a master cylinder; producing a pressure signal representative of said hydraulic signal;

producing an acceleration signal in response to a driver acceleration command;

producing undriven left and right wheel speed signals;

producing driven wheel speed signal;

generating a transition signal responsive to exiting an anti-skid control mode and entering a wheel speed based proportioning with regenerative braking control mode;

calculating a wheel speed based error signal and comparing said wheel-speed based error signal to a reference value to determine if a wheel requires additional hydraulic pressure;

entering a wheel speed based proportioning with regenerative braking control mode as a function of said wheel speed based error signal;

modulating said hydraulic signal with third build and dump valve pair in response to said transition signal so as to reduce hydraulic braking generated at said driven wheel; and commanding the drive motor to gradually increase regenerative braking of said driven wheel in response to said transition, acceleration and pressure signals.

13. A method for operating regenerative and friction braking apparatus according to claim 12, further comprising commanding said third build and dump valve pair such that brake forces generated at said driven wheel are a combination of said regenerative braking and hydraulic braking by a third hydraulic actuator, said hydraulic braking being limited in response to left and right wheel speed error signals and said transition signal by modulation of said third build and dump valve pair so as to maintain a predetermined front to rear brake proportioning through a transition from said anti-skid control mode into said wheel speed based proportioning with regenerative braking control mode.

* * * * *